(12) United States Patent
Alwan

(10) Patent No.: US 6,524,874 B1
(45) Date of Patent: *Feb. 25, 2003

(54) METHODS OF FORMING FIELD EMISSION TIPS USING DEPOSITED PARTICLES AS AN ETCH MASK

(75) Inventor: Jim Alwan, Boise, ID (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/129,978

(22) Filed: Aug. 5, 1998

(51) Int. Cl.[7] .............................. H01J 9/00; H01L 21/00
(52) U.S. Cl. ........................................................ 438/20
(58) Field of Search .......................................... 438/20

(56) References Cited

U.S. PATENT DOCUMENTS

| | | | |
|---|---|---|---|
| 4,407,695 A | | 10/1983 | Deckman et al. |
| 4,801,476 A | * | 1/1989 | Dunsmuir et al. ....... 427/430.1 |
| 5,024,873 A | | 6/1991 | Burack et al. |
| 5,220,725 A | | 6/1993 | Chan et al. |
| 5,245,248 A | | 9/1993 | Chan et al. |
| 5,286,529 A | * | 2/1994 | Nakayama et al. ......... 427/430 |
| 5,391,259 A | | 2/1995 | Cathey et al. |
| 5,399,238 A | | 3/1995 | Kumar |
| 5,510,156 A | | 4/1996 | Zhao |
| 5,614,336 A | * | 3/1997 | Mikami et al. ................. 430/5 |
| 5,660,570 A | | 8/1997 | Chan et al. |

(List continued on next page.)

OTHER PUBLICATIONS

A.K. Ray et al. Langmuir–Blodgett Films: Technology and Application. Institution of Electrical Engineers, 1994, pp. 1–5.*

A.J. Pal et al., Langmuir–Blodgett Films of Conjugated Polymers: Electroluminescence and Charge Transport Mechanisms. IEEE 1998, pp. 137–143.*

(List continued on next page.)

Primary Examiner—Wael Fahmy, Jr.
Assistant Examiner—Anh Duy Mai
(74) Attorney, Agent, or Firm—Wells St. John P.S.

(57) ABSTRACT

In one aspect, the invention includes a method of forming field emission emitter tips, comprising: a) providing a masking material over a semiconductor substrate to form a masking-material-covered substrate; b) submerging at least a portion of the masking-material-covered semiconductor substrate in a liquid; c) providing particulates suspended on an upper surface of the liquid; d) while the particulates are suspended, moving the submerged masking-material-covered substrate relative to the suspended particulates to form tightly packed monolayer of the particulates supported on the masking material of the masking-material-covered substrate; e) decreasing a dimension of the particulates to leave some portions of the masking material covered by the particulates and other portions of the masking material uncovered by the particulates; f) after decreasing the dimension and while the particulates are supported on the upper surface, exposing the masking-material-covered substrate to first etching conditions which remove uncovered portions of the masking material while leaving covered portions of the masking material over the substrate to define a patterned masking layer; g) removing the particulates; and h) while the patterned masking layer is over the semiconductor substrate, exposing the semiconductor substrate to a second etching conditions to pattern the semiconductor substrate into emitter tips.

48 Claims, 5 Drawing Sheets

U.S. PATENT DOCUMENTS

| | | | | |
|---|---|---|---|---|
| 5,676,853 A | | 10/1997 | Alwan | |
| 5,681,442 A | | 10/1997 | Ogawa et al. | |
| 5,753,130 A | * | 5/1998 | Cathey et al. | 216/11 |
| 5,795,669 A | * | 8/1998 | Zhou et al. | 430/318 |
| 5,817,373 A | * | 10/1998 | Cathey et al. | 427/458 |
| 5,970,381 A | * | 10/1999 | Ohno et al. | 438/758 |
| 6,051,149 A | * | 4/2000 | Frendt | 438/20 |
| 6,068,878 A | * | 5/2000 | Alwan | 427/77 |
| 6,083,767 A | * | 7/2000 | Tjaden et al. | 438/20 |
| 6,143,580 A | * | 11/2000 | Wells et al. | 438/20 |
| 6,174,449 B1 | * | 1/2001 | Alwan et al. | 427/547 |
| 6,228,538 B1 | * | 5/2001 | Michiels et al. | 430/5 |

OTHER PUBLICATIONS

Merriam Webster's Collegiate Dictionary—10$^{th}$ Edition, © 1996 by Merriam–Webster, Inc., p. 847 only (3 pages total).

H. W. Deckman et al.; "Applications of surface textures produced with natural lithography"; Jun. 3, 1983; pp. 1109–1112.

K. Kim et al.; "Generation of Charged Liquid Cluster Beam of Liquid–Mix Precursors and Application to Nanostructured Materials"; May 1994; pp. 597–602.

D. J. Robinson et al.; "Initiation of Aggregation in Colloidal Particle Monolayers"; Oct. 29, 1992; pp. 1436–1438.

KSV Instruments Ltd.; "KSV 5000"; undated; 8 pages.

M. Ida et al; "LETI's Fed patterning technique"; undated; 2 pages.

H. W. Deckman et al.; "Microfabrication of molecular scale microstructures"; Nov. 7, 1986; pp. 504–506.

Erwin Sheppard et al.; "Monolayer Studies—The Spreading of Polystyrene Latexes at Water/Air Interface"; Jun. 22, 1967; pp. 162–163.

Chiseki Haginoya et al.; "Nanostructure array fabrication with a size–controllable natural lithography"; Jul. 21, 1997; pp. 2934–2936.

R. Micheletto et al.; "A Simple Method for the Production of a Two–Dimensional, Ordered Array of Small Latex Particles"; Nov. 18, 1994; pp. 3333–3336.

Z. Horvolgyi et al.; "Spreading of hydrophobic silica beads at water–air interfaces"; Nov. 2, 1992; pp. 327–335.

K. S. Birdi; "Handbook of Surface and Colloid Chemistry"; undated; pp. 614–623.

* cited by examiner

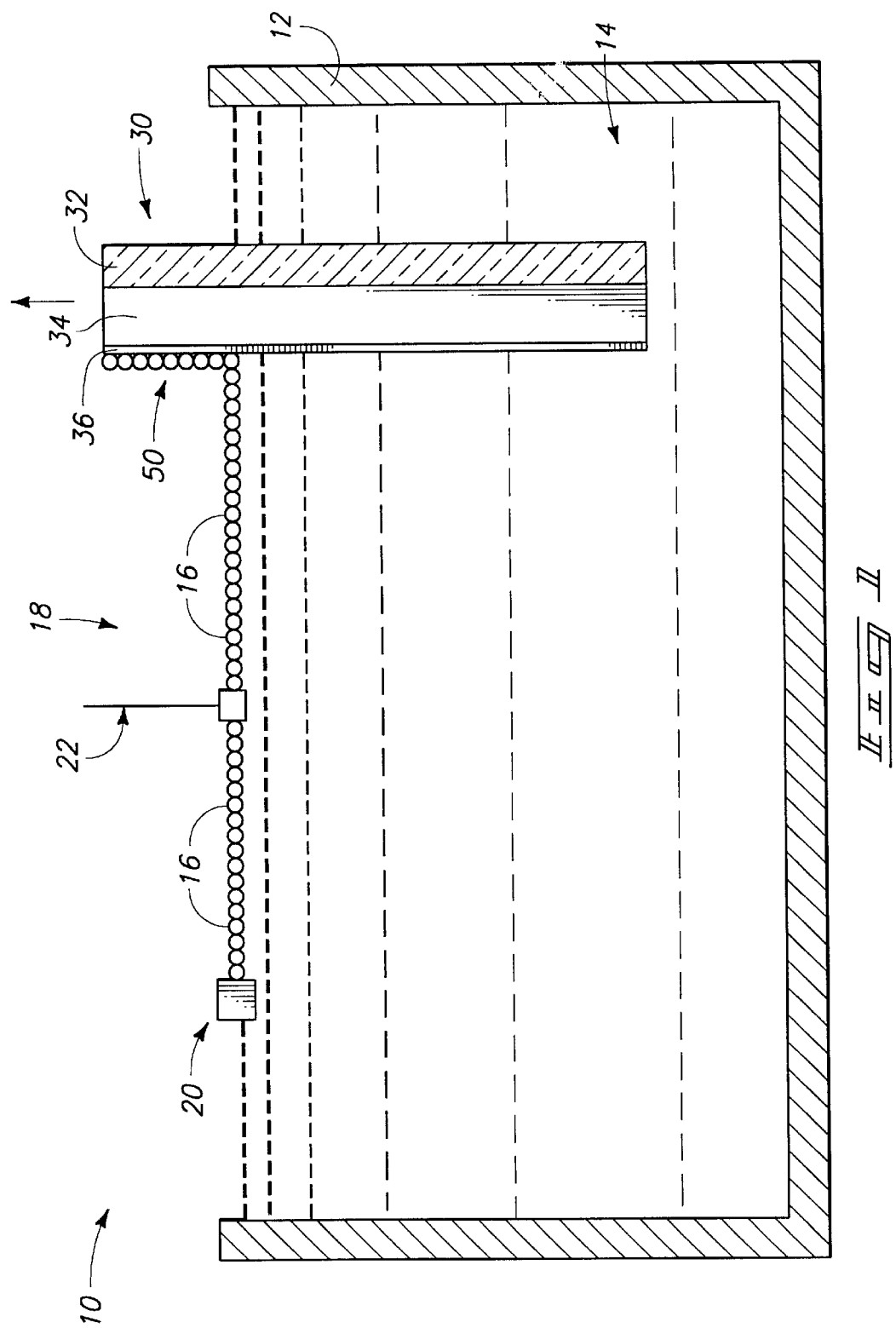

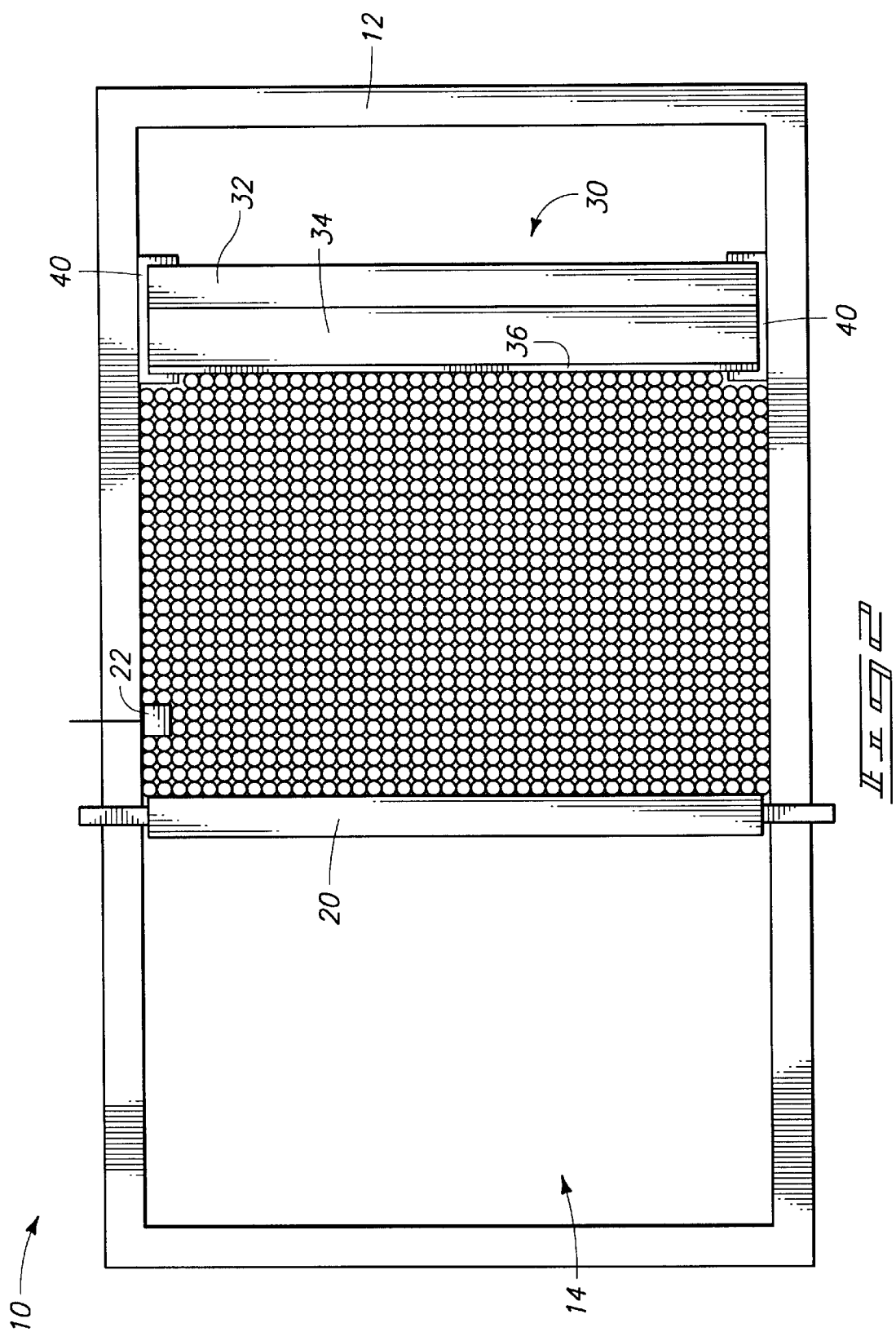

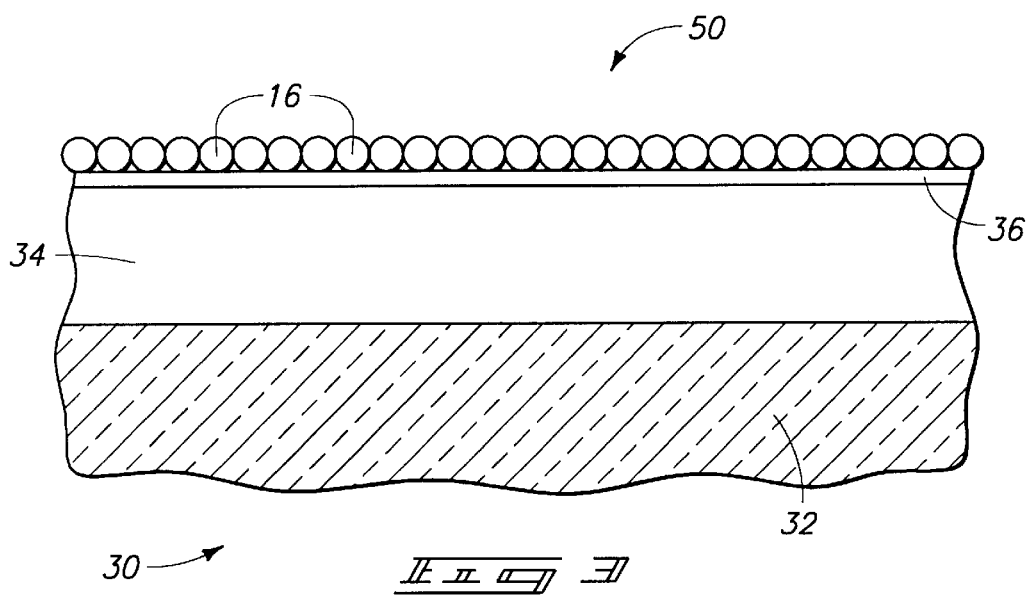
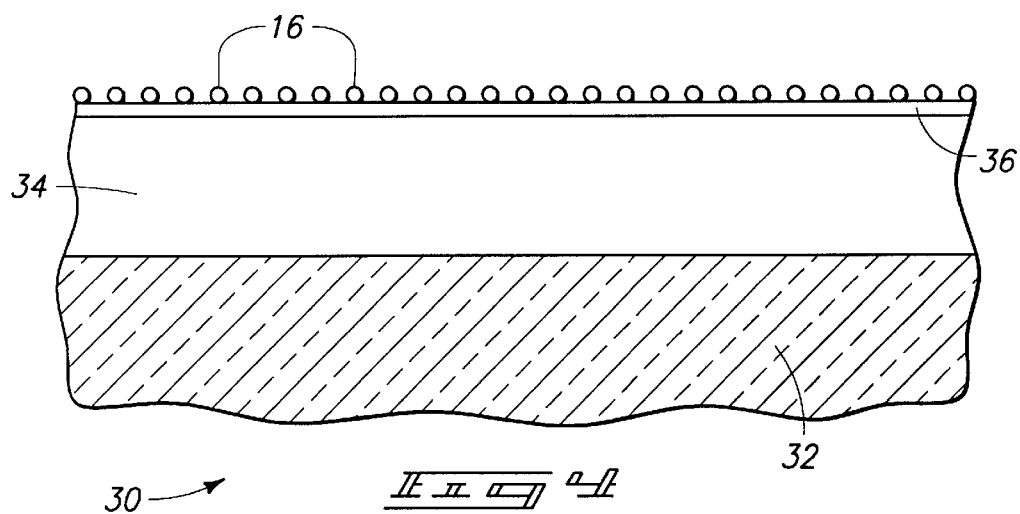

METHODS OF FORMING FIELD EMISSION TIPS USING DEPOSITED PARTICLES AS AN ETCH MASK

PATENT RIGHTS STATEMENT

This invention was made with Government support under Contract No. DABT63-97-C-0001 awarded by Advanced Research Projects Agency (ARPA). The Government has certain rights in this invention.

TECHNICAL FIELD

The invention pertains to methods of forming field emission emitter tips.

BACKGROUND OF THE INVENTION

Field emitters are widely used in display devices, such as, for example, flat panel displays. Clarity, or resolution, of a field emission display is a function of a number of factors, including emitter tip sharpness. Specifically, sharper emitter tips can produce higher resolution displays than less sharp emitter tips. Accordingly, numerous methods have been proposed for fabrication of very sharp emitter tips (i.e., emitter tips having tip radii of 100 nanometers or less). Fabrication of very sharp tips has, however, proved difficult. It has proved particularly difficult to build large areas of sharp emitter tips using photolithography while maintaining resolution and stringent dimensional control over large area substrates used for display manufacture. In light of these difficulties, it would be desirable to develop alternative methods of forming emitter tips. Several methods have been proposed. Some utilize deposited particles to form a non-photolithographic etch mask. A subsequent etching step or series of steps forms the emitter tips. The use of deposited particles on a substrate as an etch mask can reduce complexity of an etching process and improve sharpness of emitter tips relative to photolithographic processing. A difficulty with present methods of using deposited materials as an etch mask is that the materials are frequently non-uniformly deposited on a substrate surface. Accordingly, emitter tips patterned from the deposited materials are not uniformly formed across a substrate surface. It would be desirable to develop alternative methods of using deposited materials as masking layers in emitter tip formation wherein the deposited materials are uniformly deposited across a substrate surface to enable a uniform distribution of emitter tips to be etched into the substrate surface.

In methodology understood to be unrelated and never applied to emitter tip formation, Langmuir-Blodgett processing has been developed as a technique for providing a monolayer of particulates over a substrate surface. Langmuir-Blodgett processing in the context of this application involves submerging a substrate in a liquid and providing particulates floating on a surface of the liquid. The particulates are preferably in the form of a monolayer on the liquid surface. The monolayer can be maintained as a tightly packed monolayer by providing a pushing bar to compact the particulates together. The substrate is subsequently pulled through the tightly packed monolayer to form an even coating of particulate materials on the substrate surface.

SUMMARY OF THE INVENTION

In one aspect, the invention encompasses a method of forming field emission emitter tips. A masking material is provided over a semiconductor substrate to form a masking-material-covered substrate. At least a portion of the masking-material-covered semiconductor substrate is submerged in a liquid. Particulates are provided to be suspended on an upper surface of the liquid. While the particulates are suspended, the submerged masking-material-covered substrate is moved relative to the suspended particulates to form a layer of the particulates supported on the masking material of the masking-material-covered substrate. In a subsequent step, a dimension of the particulates is decreased to leave some portions of the masking material covered by the particulates and other portions of the masking material uncovered by the particulates. After decreasing the dimension and while the particulates are supported on the upper surface, the masking-material-covered substrate is exposed to first etching conditions to remove uncovered portions of the masking material while leaving covered portions of the masking material over the substrate to define a patterned masking layer. The particulates can then be removed. While the so patterned masking layer is over the semiconductor substrate, the semiconductor substrate is exposed to second etching conditions to pattern the semiconductor substrate into emitter tips.

BRIEF DESCRIPTION OF THE DRAWINGS

Preferred embodiments of the invention are described below with reference to the following accompanying drawings.

FIG. 1 is a diagrammatic, cross-sectional view of a bead application apparatus of the present invention.

FIG. 2 is a top view of the FIG. 1 apparatus.

FIG. 3 is a diagrammatic, fragmentary, cross-sectional view of a semiconductor substrate comprising a monolayer of particles formed according to a method of the present invention.

FIG. 4 is a view of the FIG. 3 substrate shown at a processing step subsequent to that of FIG. 3.

DETAILED DESCRIPTION OF THE PREFERRED EMBODIMENTS

Figure 5:
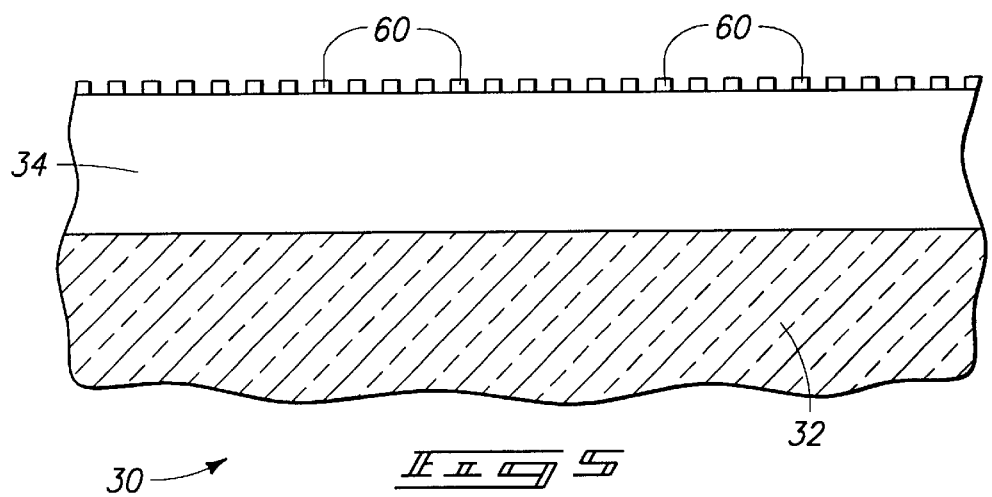
FIG. 5 is a view of the FIG. 3 substrate shown at a processing step subsequent to that of FIG. 4.

This disclosure of the invention is submitted in furtherance of the constitutional purposes of the U.S. Patent Laws "to promote the progress of science and useful arts" (Article 1, Section 8).

The invention encompasses methods of forming emitters wherein a monolayer of particles is utilized to define emitter tip regions. A laboratory-test-scaled method for forming a monolayer of particles is as follows. First, a solution of distilled deionized water is prepared and a pH of the water is adjusted to about 3.5. The pH can be adjusted with dilute hydrochloric acid. Two to three drops of the pH 3.5 water are placed on a clean microscope glass slide. Surfactant-free carboxyl latex beads in water (having diameters approximately equal to about 1.7 micrometers) are provided in a clean vial and about 10% (volume to volume) methanol is added to the mixture. A clean pipet is utilized to provide one drop of the bead/water/methanol mixture into the pH 3.5 water on the slide. A two-dimensional array of the beads forms instantly on the water surface, covering an entire surface of the water (about 1 square centimeter). The two-dimensional array typically does not form if the water pH is neutral, or if there is no methanol in the mixture. Also, the latex beads will typically aggregate if the water pH is too low (for example, about pH 2). A factor that can be important for surface array formation is that polystyrene is itself hydrophobic, but can contain a surface charge (from, for example, polymerization initiation or copolymers like acrylic acid) which makes latex particles hydrophilic. Non-ionic initiators can be used to prevent surface charge from being present. However, surfactant should be used in such cases to maintain the stability (prevent aggregation) both during and after particle manufacturing processes. A surfactant (ionic or non-ionic) will make the particle surfaces hydrophilic, which can stabilize a monolayer of the latex beads. Accordingly, it can be preferred to utilize latex particles having some charge groups on the surface, such as, for example, surfactant-free carboxyl groups.

It is noted that an effective surface charge can be variable on surfactant-free carboxyl latex particles, enabling surface hydrophobicity to be controlled. Particle hydrophobicity can be controlled, for example, by adjusting a pH to about a surface charge pKa value. A pKa for carboxyl groups is around 4 (in other words, particle effective charge will be reduced and eventually disappear if a pH is adjusted lower than 4). When an effective surface charge drops, particles become increasingly hydrophobic, and it becomes increasingly thermodynamically unfavorable for the particles to be within an aqueous liquid. Accordingly, the particles migrate and aggregate to a water surface, or aggregate within the water to form a clump. Generally, surface aggregation occurs before clumping, and if charge is reduced gradually a monolayer will be formed over the surface. Accordingly, it can be important to carefully adjust pH to avoid having beads clump within an aqueous solution instead of forming a monolayer over the solution. A potentially useful modification of the above-described procedure is to provide a buffering material within the aqueous solution to simply control pH of the solution.

Surface aggregation by diffusion can be very slow, and can be unfavored if particles have a density higher than a suspending medium. Accordingly, methanol is utilized in the above-described process. Methanol can propel a particle to surface when it goes into water.

FIGS. 1 and 2 illustrate an apparatus 10 utilized in a preferred method for forming a monolayer of particles on a semiconductor substrate. Apparatus 10 comprises a vessel 12 containing a liquid 14. Liquid 14 can comprise, for example, an aqueous solution having a pH of about 3.5. Such aqueous solution can further comprise an alcohol, such as, for example, methanol, and a buffer to aid in maintaining a pH of liquid 14 at a desired pH.

Particulates 16 are provided in liquid 14 and form a monolayer 18 over a surface of liquid 14. The term "monolayer" refers to a layer of particulates 16 having a thickness of a single particle. In other words, particulates 16 do not overlay one another. Particulates 16 preferably comprise one or more materials phobic relative to liquid 14, more preferably predominately comprise one or more materials phobic to the liquid (i.e., more than 50% of the particulate, by weight, being phobic materials) and can consist essentially of materials phobic relative to liquid 14. For instance, if liquid 14 comprises water, particles 16 preferably comprise hydrophobic materials. If liquid 14 comprises water and methanol and a pH of about 3.5, particulates 16 can comprise, for example, latex beads, such as carboxyl latex beads. Particulates 16 can be approximately spherical and have diameters of from about 1.0 to about 2.0 micrometers and most preferably of about 1.7 micrometers. Also preferably, no surfactant is provided at a surface of liquid 14. Surfactant could cling to a surface of a substrate processed according to a method of the present invention and adversely affect subsequent processing of the substrate.

A pusher bar 20 is provided to compress particulates 16 against one another to form a "tightly packed" monolayer. The term "tightly packed" is defined to mean that particulates 16 physically contact one another throughout monolayer 18, rather than being dispersed from one another in monolayer 18. In a uniform tightly packed monolayer, all of the particles 16 will be physically against other particulates 16 and will form a single layer over liquid 14.

A parameter that can be important for maintaining monolayer 18 as a tightly packed monolayer is a surface tension at a surface of liquid 14. Accordingly, a surface tension meter 22 is preferably provided and monitored to ascertain that a constant surface tension over liquid 14 is maintained by suitable application of pressure against beads 16 with pusher bar 20. Surface tension meter 22 is preferably coupled with circuitry to convert a surface tension to a signal which can be either continuously monitored by appropriate software or monitored by a technician during use of apparatus 10. Furthermore, the surface tension can be maintained at a value preferable for achieving a monolayer coating by providing feedback circuitry between the surface tension meter 22 and pusher bar 20. Pusher bar 20 is preferably mechanically joined to an apparatus for pushing pusher bar 20 against beads 16. A suitable mechanical apparatus can comprise, for example, a step motor configured to push pusher bar 20 in small increments (i.e., increments on the order of 1 to 10 microns).

A semiconductor substrate 30 is provided within apparatus 10 and initially at least partially submerged within liquid 14. To aid in interpretation of this disclosure and the claims that follow, the term "semiconductor substrate" is defined to mean any construction comprising semiconductive material, including, but not limited to, bulk semiconductive materials (either alone or in assemblies comprising other materials thereon), and semiconductive material layers (either alone or in assemblies comprising other materials). The term "substrate" refers to any supporting structure, including, but not limited to, the semiconductor substrates described above.

In the shown embodiment, substrate 30 comprises a glass 32, a semiconductive material layer 34 overlaying glass 32, and a masking material layer 36 overlaying semiconductive material layer 34. Semiconductive material layer 34 can comprise, for example, monocrystalline silicon lightly doped with a p-type dopant. Masking layer 36 can comprise, for example, silicon dioxide. Substrate 30 can be inserted in liquid 14 provided before beads 16 are provided at a surface of liquid 14. Preferably, substrate 30 is initially provided to be only partially submerged within liquid 14 so that substrate 30 effectively forms a dam preventing particulates 16 from migrating to behind substrate 30 and against glass 32. In the shown embodiment, substrate 30 is contained within a gasket material 40 (FIG. 2) which is provided against both sides of substrate 30 within vessel 12. Gasket material 40 can provide a seal against substrate 30 to prevent particulates 16 from migrating around substrate 30. Gasket material 40 can comprise a number of materials known to persons of ordinary skill in the art, including, for example, rubber or plastic.

After provision of substrate 30 and particulates 16 within apparatus 10, substrate 30 is moved relative to an upper surface of liquid 14. Such moving can comprise, for example, moving substrate 30, the upper surface of liquid 14, or both substrate 30 and the upper surface liquid 14. For instance, liquid 14 can be drained from vessel 12 to move substrate 30 relative to the upper surface of liquid 14. Alternatively, and as shown, substrate 30 can be lifted from liquid 14 to move substrate 30 relative to an upper surface of liquid 14.

During the moving of substrate 30 relative to the upper surface of liquid 14, particulates 16 form a monolayer 50 over masking material 36 of substrate 30. Pusher bar 20 preferably maintains a constant pressure of particulates 16 against masking material 36 as substrate 30 is moved relative to the surface of liquid 14 to form a substantially uniform and tightly packed monolayer 50 over masking material layer 36.

Figure 8:
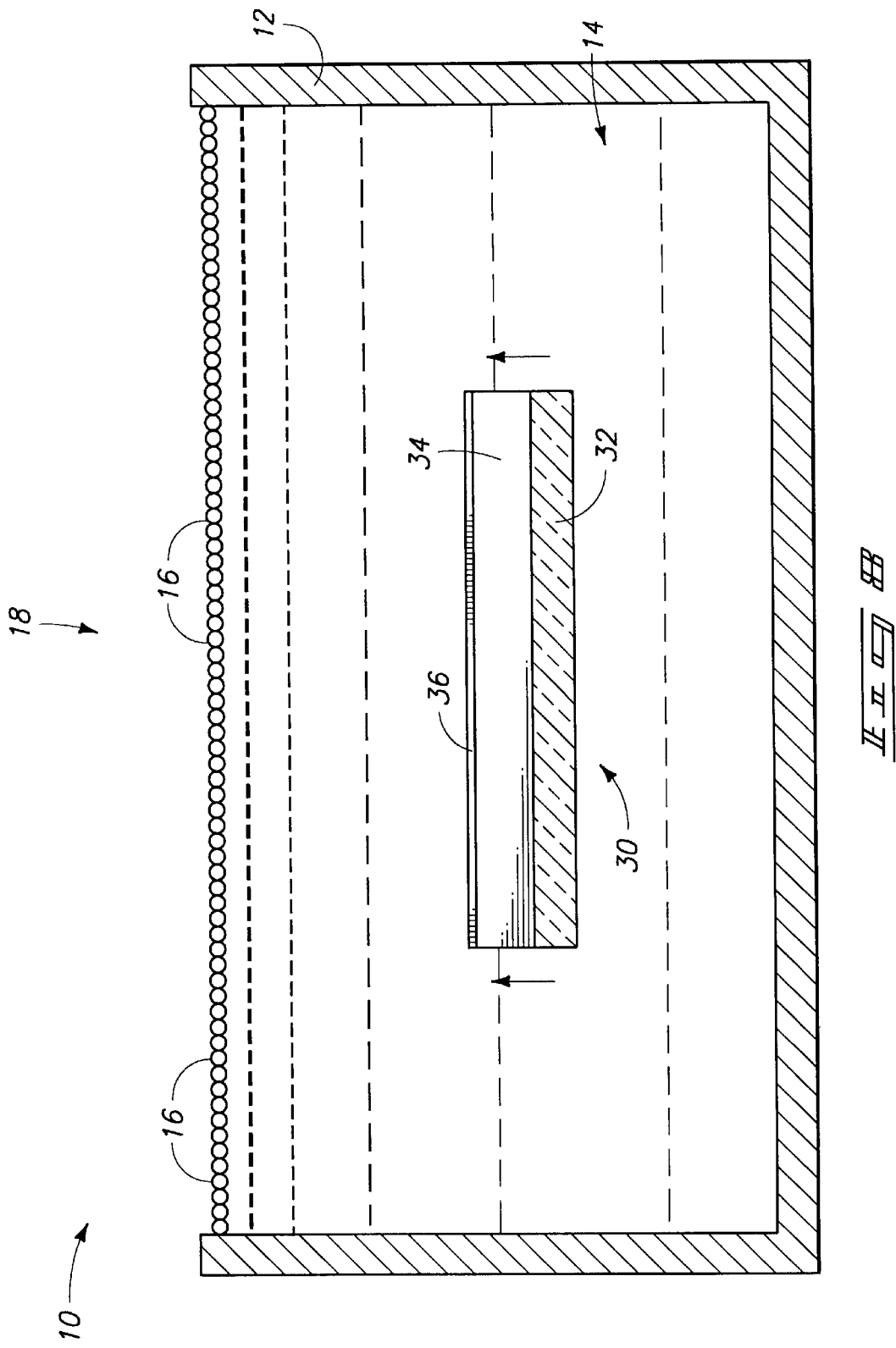
FIG. 8 is a diagrammatic, cross-sectional view of a second embodiment bead application method of the present invention.

In the shown preferred embodiment, monolayer 50 is formed over a surface of masking material layer 36 that is substantially perpendicular to an upper surface of liquid 14. It is to be understood, however, that the invention encompasses other embodiments wherein substrate 30 is tilted relative to the upper surface of liquid 14 as substrate 30 is moved relative to the upper surface. For instance, FIG. 8 illustrates an embodiment wherein gaskets 40 are eliminated, and wherein substrate 30 is initially entirely submerged within liquid 14. An upper surface of submerged masking layer 36 is substantially parallel with an upper surface of liquid 14. A distance between the upper surface of liquid 14 and an upper surface of making material 36 is then decreased until particulates 16 are deposited on masking layer 36. During such depositing, the upper surface of masking layer 36 can remain substantially parallel to the upper surface of liquid 14.

In addition to the above-described embodiments, the invention also encompasses embodiments wherein substrate 30 is tilted at an angle such that a surface of masking layer 36 upon which beads 16 are deposited is neither perpendicular nor parallel with an upper surface of liquid 14 as substrate 30 is moved relative to the upper surface of liquid 14.

Referring to FIG. 3, substrate 30 is illustrated after formation of monolayer 50 over masking material 36 and removal of substrate 30 from liquid 14. Particulates 16 of monolayer 50 can then be exposed to conditions which decrease a dimension of the particulates to expose portions of masking material 36 between the particulates. An example condition for shrinking particulates 16 is exposure to an oxygen plasma to oxidize the beads and shrink them at a controlled rate. Another example method for reducing a dimension of the beads is to heat them to a temperature which evaporates materials from the beads. Yet another example method for reducing a dimension of the beads is to etch them with, for example, a chemical wet etch. A mean diameter of spherical particulates 16 is preferably reduced at least about 20%, and more preferably at least about 50% prior to subsequent process steps. It is to be understood, however, that the invention also encompasses embodiments in which a dimension of particulates 16 is not reduced prior to subsequent process steps. For instance, it can be desired to not reduce a dimension of particulates 16 if a subsequent etch of layer 36 (described below with reference to FIG. 6) is sufficiently isotropic.

Referring to FIG. 4, substrate 30 is illustrated after a dimension of particulates 16 has been decreased. Particulates 16 now cover some portions of masking layer 36, while leaving other portions of masking material between particulates 16 uncovered. Substrate 30 is then exposed to first etching conditions to remove portions of masking material layer 36 exposed between particulates 16. The first etching conditions are preferably highly anisotropic to remove material of masking layer 36 along a vertical profile without substantially undercutting particulates 16. Suitable etching processes include plasma etching and reactive ion etching. In embodiments in which particulates 16 comprise latex and masking material layer 36 comprises silicon dioxide, the first etching conditions can comprise, for example, an ion assisted etch utilizing He and one or both of $CHF_3$ and $CF_4$.

After etching of masking layer 36, substrate 30 can be exposed to conditions which remove particulates 16 from over remaining portions of masking material layer 36. Suitable conditions for removing particulates 16 include, for example, one or more of physical cleaning, chemical cleaning, or dry etching. An example method for removing particulates 16 from masking material 36 is vibration of substrate 30 in an ultrasonic bath. Although particulates 16 are removed in the shown preferred embodiment, it is to be understood that the invention also encompasses embodiments in which particulates are not removed.

FIG. 5 shows substrate 30 after exposure to the first etching conditions and after removal of particulates 16. Etching of masking layer 36 (FIG. 4) has converted the masking layer to a patterned mask 60 which covers portions of semiconductive material 34 and leaves other portions uncovered.

Figure 6:
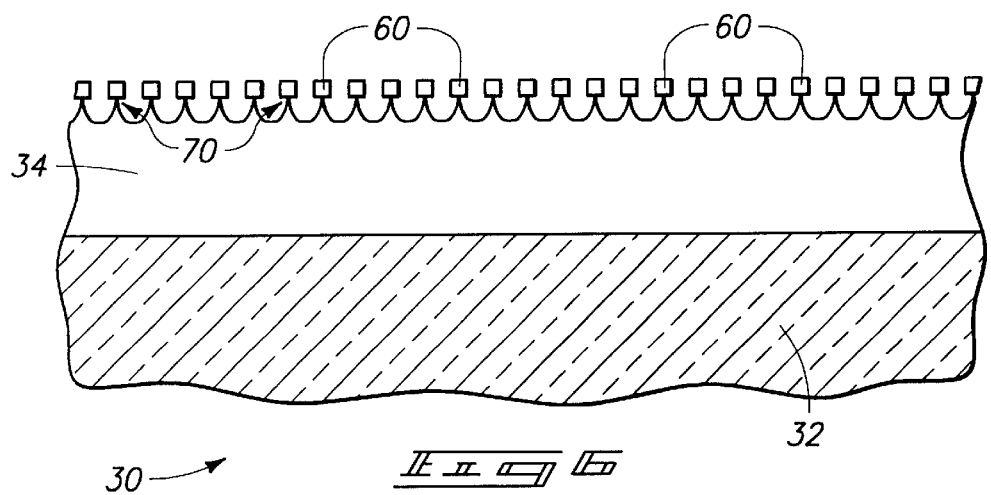
FIG. 6 is a view of the FIG. 3 substrate shown at a processing step subsequent to that of FIG. 5.

Referring to FIG. 6, substrate 30 is exposed to second etching conditions to etch exposed portions of substrate 34 and form conical emitter tips 70 (only some of which are labeled in FIG. 6) under patterned masking layer 60. In embodiments in which masking layer 60 comprises silicon dioxide and layer 34 comprises monocrystalline, polycrystalline or amorphous silicon, second etching conditions can comprise isotropic etch processes known in the art.

Figure 7:
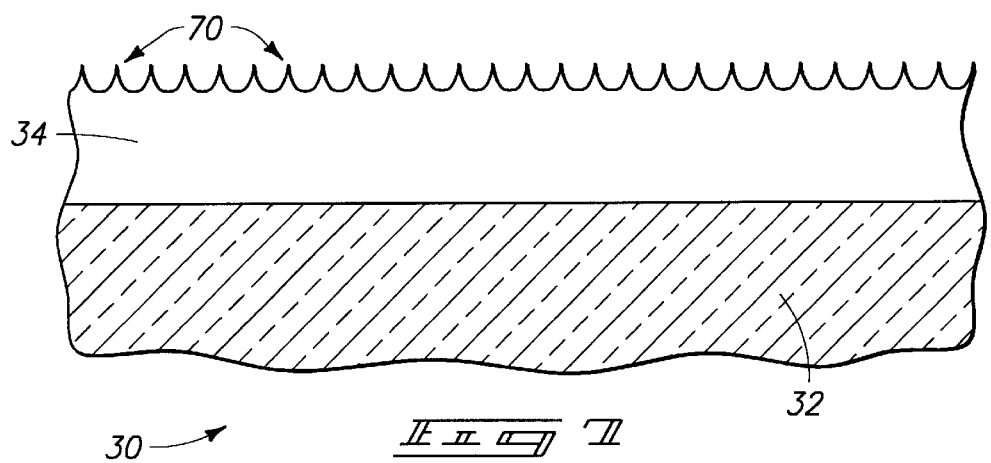
FIG. 7 is a view of the FIG. 3 substrate shown at a processing step subsequent to that of FIG. 6.

Referring to FIG. 7, patterned masking layer 60 is removed from substrate 30 to form an emitter tip array. In embodiments in which masking layer 60 comprises silicon dioxide, it can be removed by, for example, wet etching utilizing buffered hydrofluoric acid. The emitter tip array of FIG. 7 can be incorporated into, for example, a flat panel display device as an emitter assembly.

In alternative embodiments (not shown), layer 36 can be eliminated and beads 16 can be utilized directly as the masks for formation of conical tips 70 (FIG. 6). Also, although the invention is described with reference to conical tip formation from semiconductive substrates, it is to be understood that the invention can have application to etching of non-semiconductive substrates.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of forming field emission emitter tips, comprising:

submerging at least a portion of a masking-material-covered semiconductor substrate in a liquid;

providing particulates suspended on an upper surface of the liquid;

while the particulates are suspended, moving the submerged masking-material-covered substrate relative to the suspended particulates to form a tightly packed monolayer of the particulates supported on masking material covering the masking-material-covered substrate;

decreasing a dimension of the particulates to leave some portions of the masking material covered by the particulates and other portions of the masking material uncovered by the particulates;

after decreasing the dimension, exposing the masking-material-covered substrate to first etching conditions to remove uncovered portions of the masking material and define a patterned masking layer;

removing the particulates; and while the patterned masking layer is over the semiconductor substrate, exposing the semiconductor substrate to second etching conditions to pattern the semiconductor substrate into emitter tips.

2. The method of claim 1 wherein decreasing the dimension of the particulates comprises exposing the particulates to a plasma.

3. The method of claim 1 wherein moving forms the layer on a surface of the masking material, and wherein moving comprises maintaining the surface of the masking material substantially perpendicular to the upper surface of liquid as the layer is formed.

4. The method of claim 1 wherein moving forms the layer on a surface of the masking material, and wherein moving comprises maintaining the surface of the masking material substantially parallel to the upper surface of liquid as the layer is formed.

5. The method of claim 1 wherein moving forms the layer on a surface of the masking material, and wherein moving comprises maintaining the surface of the masking material at an angle as the layer is formed, said angle being neither parallel to the upper surface of liquid or perpendicular to the upper surface of the liquid.

6. The method of claim 1 wherein submerging comprises submerging a substrate including masking material comprising silicon dioxide.

7. The method of claim 1 wherein providing particulates comprises providing one or more materials that are phobic relative to the liquid.

8. The method of claim 2 wherein providing particulates comprises providing one or more materials that are phobic relative to the liquid.

9. The method of claim 1 wherein providing particulates comprises providing one or more materials that are hydrophobic and the liquid comprises water.

10. The method of claim 2 wherein providing particulates comprises providing one or more materials that are hydrophobic and the liquid comprises water.

11. The method of claim 1 wherein moving comprises raising the semiconductor substrate within the liquid.

12. The method of claim 1 wherein moving comprises removing liquid.

13. The method of claim 1 wherein providing particulates comprises providing particulates suspended in a monolayer that covers substantially an entirety of the upper surface of the liquid.

14. The method of claim 1 wherein providing particulates comprises providing particulates suspended in a tightly packed monolayer at the upper surface of the liquid.

15. The method of claim 1 wherein providing particulates comprises providing particulates that are substantially spherical and suspended in a tightly packed monolayer at an upper surface of the liquid.

16. The method of claim 1 wherein moving comprises moving the submerged masking-material-covered substrate relative to the suspended particulates to form a monolayer of the suspended particulates.

17. The method of claim 1 wherein moving comprises moving the submerged masking-material-covered substrate relative to the suspended particulates to form a tightly packed monolayer of the suspended particulates.

18. A method of forming field emission emitter tips, comprising:

submerging a masking-material-covered semiconductor substrate in a liquid, the masking-material-covered semiconductor substrate having an upper surface comprising the masking material, the upper surface being substantially parallel to an upper surface of the liquid;

providing particulates suspended on the upper surface of the liquid;

while the particulates are suspended, moving the submerged masking-material-covered substrate relative to the suspended particulates to form a layer of the particulates supported on masking material covering the masking-material-covered substrate, the upper surface comprising the masking material remaining substantially parallel to the upper surface of the liquid as the masking-material-covered substrate is moved;

decreasing a dimension of the particulates to leave a first portion of the masking material that is covered by the particulates and a second portion of the masking material that is uncovered by the particulates;

after decreasing the dimension, exposing the masking-material-covered substrate to first etching conditions to remove uncovered portions of the masking material and define a patterned masking layer;

removing the particulates; and while the patterned masking layer is over the semiconductor substrate, exposing the semiconductor substrate to second etching conditions to pattern the semiconductor substrate into emitter tips.

19. The method of claim 18 wherein moving comprises raising the semiconductor substrate within the liquid.

20. The method of claim 18 wherein moving comprises removing liquid.

21. The method of claim 18 wherein providing particulates comprises suspending particulates in a monolayer that covers substantially an entirety of the upper surface of the liquid.

22. The method of claim 18 wherein providing particulates comprises suspending particulates in a tightly packed monolayer at the upper surface of the liquid.

23. The method of claim 18 wherein providing particulates comprises suspending substantially spherical particulates in a tightly packed monolayer at an upper surface of the liquid.

24. A method of forming field emission emitter tips, comprising:

submerging at least a portion of a semiconductive substrate including a masking layer formed on a surface of the substrate in a liquid;

providing particulates suspended on an upper surface of the liquid;

while the particulates are suspended, moving the submerged substrate relative to the suspended particulates to form a tightly packed monolayer of particulates supported on the masking layer on the substrate;

reducing a dimension of the particulates before etching the masking layer;

etching the masking layer while the particulates are over the masking layer to pattern the masking layer to define portions of the substrate for formation of emitter tips; and etching the substrate while masking the substrate with the patterned masking layer to define emitter tips.

25. The method of claim 24 further comprising removing the particulates from over the masking layer before etching the substrate.

26. The method of claim 24 wherein etching the substrate comprises etching the substrate while the particulates are over the substrate.

27. A method of forming field emission emitter tips, comprising:

submerging at least a portion of a masking-material-covered semiconductor substrate in a liquid;

providing particulates suspended on an upper surface of the liquid;

while the particulates are suspended, moving the submerged masking-material-covered substrate relative to the suspended particulates to form a tightly packed monolayer of the particulates supported on masking material covering the masking-material-covered substrate, wherein moving forms the layer on a surface of the masking material, and wherein moving comprises maintaining the surface of the masking material parallel to the upper surface of the liquid as the layer is formed;

decreasing a dimension of the particulates to leave some portions of the masking material that is covered by the particulates and other portions of the masking material uncovered by the particulates;

after decreasing the dimension, exposing the masking-material-covered substrate to first etching conditions to remove uncovered portions of the masking material and define a patterned masking layer;

removing the particulates; and while the patterned masking layer is over the semiconductor substrate, exposing the semiconductor substrate to second etching conditions to pattern the semiconductor substrate into emitter tips.

28. The method of claim 27 wherein decreasing the dimension of the particulates comprises exposing the particulates to a plasma.

29. The method of claim 27 wherein submerging comprises submerging a substrate including masking material comprising silicon dioxide.

30. The method of claim 27 wherein providing particulates comprises providing one or more materials that are phobic relative to the liquid.

31. The method of claim 27 wherein providing particulates comprises providing one or more materials that are phobic relative to the liquid and the liquid comprises water.

32. The method of claim 27 wherein providing particulates comprises providing one or more materials that are hydrophobic and the liquid comprises water.

33. The method of claim 27 wherein the liquid comprises water.

34. The method of claim 27 wherein moving comprises raising the semiconductor substrate within the liquid.

35. The method of claim 27 wherein moving comprises removing liquid.

36. The method of claim 27 wherein providing particulates comprises providing particulates suspended in a tightly packed monolayer at the upper surface of the liquid.

37. The method of claim 27 wherein providing particulates comprises providing particulates that are substantially spherical and suspended in a tightly packed monolayer at an upper surface of the liquid.

38. The method of claim 27 wherein moving comprises moving the submerged masking-material-covered substrate relative to the suspended particulates to form a monolayer of the suspended particulates.

39. The method of claim 27 wherein moving comprises moving the submerged masking-material-covered substrate relative to the suspended particulates to form a tightly packed monolayer of the suspended particulates.

40. A method of forming field emission emitter tips, comprising:

providing a masking layer on a substrate including a semiconductive material;

submerging at least a portion of the substrate in a liquid;

providing particulates suspended on an upper surface of the liquid;

while the particulates are suspended, moving the submerged substrate relative to the suspended particulates to form a monolayer of particulates supported on a surface of the substrate, at least some of the particulates being laterally adjacent one another;

reducing a dimension of the particulates; and etching the masking layer while the particulates are over the masking layer to pattern the masking layer utilizing the particulates as a mask;

removing material from the substrate surface utilizing the patterned masking layer as a mask to define portions of the substrate for formation of emitter tips.

41. The method of claim 40 further comprising removing the particulates from over the masking layer before removing material from the substrate surface.

42. The method of claim 40 wherein removing comprises etching the substrate while the particulates are over the substrate.

43. The method of claim 40 wherein moving comprises maintaining the surface of the masking material parallel to the upper surface of liquid as the layer is formed.

44. method of forming field emission emitter tips, comprising:

submerging at least a portion of a masking-material-covered semiconductor substrate in a liquid comprising an aqueous methanol solution having a pH of about 3.5 and including a surfactant;

providing particulates suspended on an upper surface of the liquid, the particulates comprising carboxyl latex beads having diameters in a range of from one to two micrometers;

while the particulates are suspended, moving the submerged masking-material-covered substrate relative to the suspended particulates to form a tightly packed monolayer of the particulates supported on masking material covering the masking-material-covered substrate, wherein moving forms the layer on a surface of the masking material, and wherein moving comprises maintaining the surface of the masking material parallel to the upper surface of the liquid as the layer is formed;

decreasing a dimension of the particulates by exposing the particulates to a plasma to leave some portions of the masking material that is covered by the particulates and other portions of the masking material uncovered by the particulates;

after decreasing the dimension, exposing the masking-material-covered substrate to first etching conditions to remove uncovered portions of the masking material and define a patterned masking layer;

removing the particulates; and while the patterned masking layer is over the semiconductor substrate, exposing the semiconductor substrate to second etching conditions to pattern the semiconductor substrate into emitter tips.

45. The method of claim 44 wherein submerging comprises submerging a lightly p-type monocrystalline silicon substrate including masking material comprising silicon dioxide.

46. The method of claim 44 wherein moving comprises raising the semiconductor substrate within the liquid.

47. The method of claim 44 wherein moving comprises removing liquid.

48. The method of claim 44 wherein moving comprises moving the submerged masking-material-covered substrate relative to the suspended particulates to form a tightly packed monolayer of the suspended particulates.

* * * * *

UNITED STATES PATENT AND TRADEMARK OFFICE
CERTIFICATE OF CORRECTION

PATENT NO. : 6,524,874 B1
DATED : February 25, 2003
INVENTOR(S) : Jim Alwan

It is certified that error appears in the above-identified patent and that said Letters Patent is hereby corrected as shown below:

Column 5,
Line 29, replace "liquid 14 and an upper surface of making material 36 is then" with -- liquid 14 and an upper surface of masking material 36 is then --

Column 10,
Line 46, replace "method of forming field emission emitter tips," with -- A method of forming field emission emitter tips, --

Signed and Sealed this

First Day of July, 2003

JAMES E. ROGAN
*Director of the United States Patent and Trademark Office*